United States Patent [19]

Henkelmann

[11] 3,937,569
[45] Feb. 10, 1976

[54] SLIDE PROJECTOR HAVING A PARTITIONED MAGAZINE

[75] Inventor: Kurt Henkelmann, Wissmar, Germany

[73] Assignee: Ernst Leitz G.m.b.H.

[22] Filed: Nov. 23, 1973

[21] Appl. No.: 418,257

[30] Foreign Application Priority Data

Dec. 13, 1972 Germany............................ 2260887

[52] U.S. Cl.................................. 353/116; 353/117
[51] Int. Cl.²........................................... G03B 23/04
[58] Field of Search .............. 353/116, 117, 92, 114

[56] References Cited
UNITED STATES PATENTS

| 2,756,630 | 7/1956 | Goldberg | 353/116 |
| 2,909,962 | 10/1959 | Goldberg | 353/92 |
| 2,942,365 | 6/1960 | Badalich | 353/116 |
| 3,025,759 | 3/1962 | King | 353/116 |
| 3,120,150 | 2/1964 | Brown | 353/92 |
| 3,143,036 | 8/1964 | Rohmann | 353/116 |
| 3,606,545 | 9/1971 | Heinzmann et al. | 353/117 |
| 3,704,943 | 12/1972 | Rube | 353/117 |

*Primary Examiner*—Richard E. Aegerter
*Assistant Examiner*—John W. Shepperd
*Attorney, Agent, or Firm*—Gilbert L. Wells

[57] ABSTRACT

In a slide projector having a partioned magazine for insertion into a magazine guide track so that the in turn, effective ejection side of the magazine is at right angles to or generally at right angles to the horizontal film aperture, the improvement comprising the operative bearing side of the magazine opposite the leading edge of the image stage side of the contained slide in the projector is foreshortened and the magazine guide path (1), considered in crosssection, is provided with a step (7) at least in the region of the film aperture (6), the profile of this step (7) adapted so that the bearing side (8) of the magazine containing a slide (10), and the face (10a) of the step which is situated at a higher level and thus suitable for receiving the slides as soon as the magazine is inserted, continues in the form of the film aperture (11).

10 Claims, 8 Drawing Figures

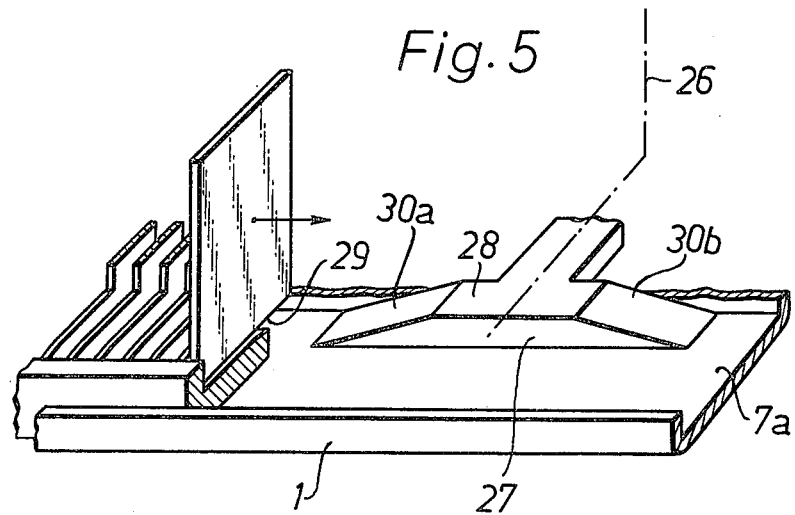
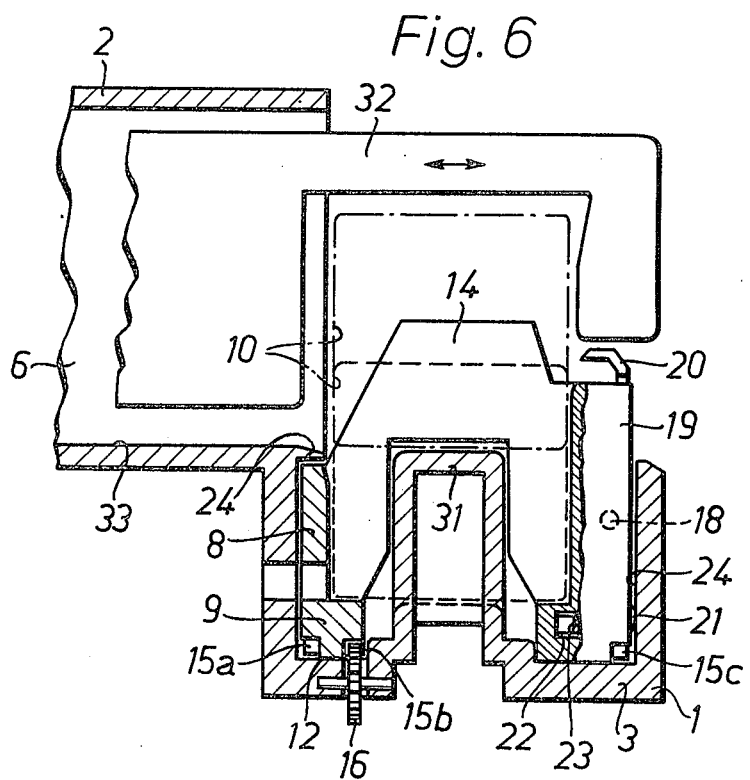

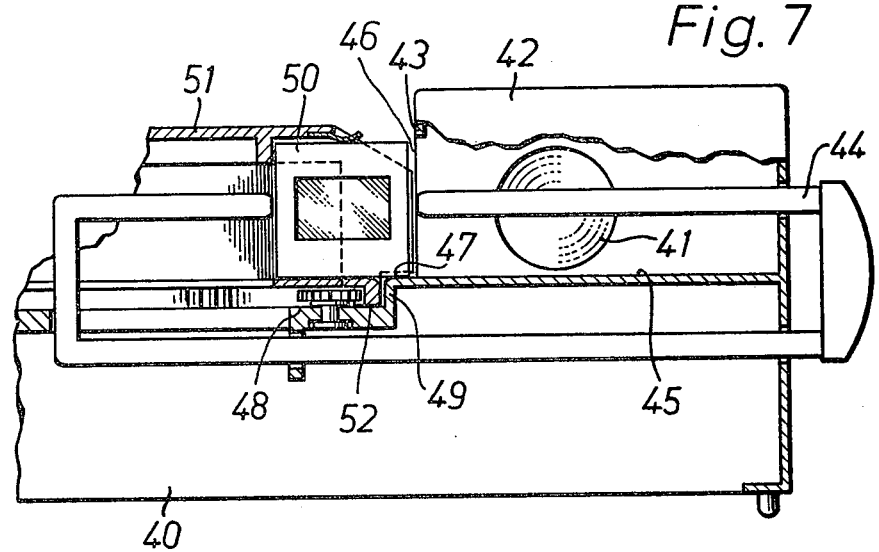
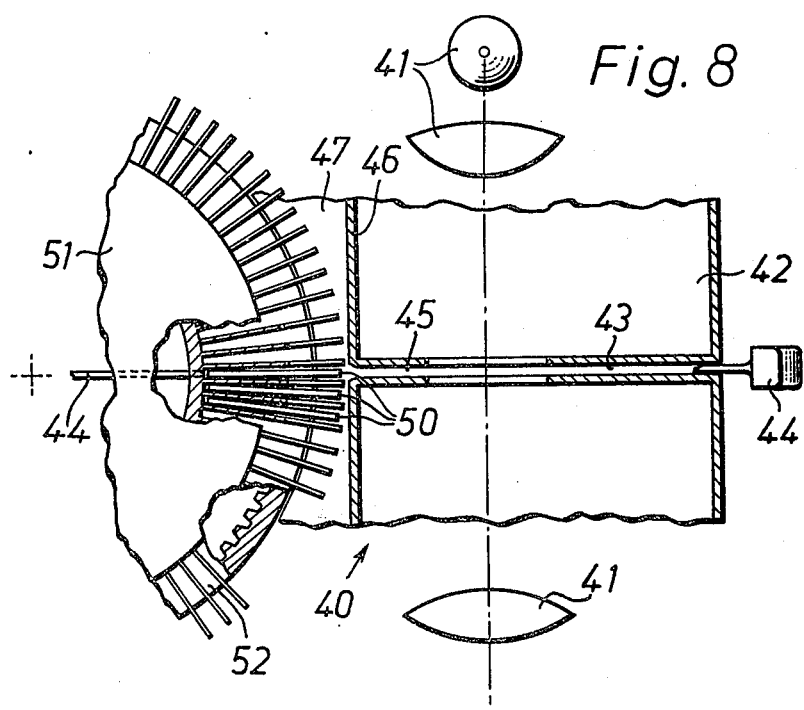

SLIDE PROJECTOR HAVING A PARTITIONED MAGAZINE

CROSS REFERENCE TO A RELATED APPLICATION

Applicant claims priority under 35 U.S.C. 119 for application Ser. No. P 22 60 887.3, filed Dec. 13, 1972 in the Patent Office of the Federal Republic of Germany.

BACKGROUND OF THE INVENTION

The present invention relates to a slide projector comprising a partitioned magazine which is designed to be inserted into the magazine guide path so that the in turn, effective ejection side of the magazine is at right angles to or generally at right angles to the horizontal film aperture. A push rod is designed to engage the individual slides in succession through a break in the bottom face opposite the ejection side and to push them into the film aperture. The return movement is effected by a return element coupled with the push rod.

Devices of this nature are known in themselves. At the beginning of the feed movement, the slide to be moved into the projection position moves onto the bearing path of the film aperture immediately after leaving the magazine and is moved forward until it reaches the desired position with respect to the projection window, in which it is preferably oriented by a stop. The critical point in the insertion stage is the moment when the front lower edge of the slide is placed on the film aperture. Difficulties can easily occur at this stage, especially if the intermediate space between the support in the magazine and the support of the film aperture is relatively large. The slide can easily tip forward, strike against the intake and remain suspended there.

For this reason, to improve the changing operation, not only has the distance in question been reduced as far as possible, but the front edge of the film aperture has also been chamfered so as to facilitate insertion of the slides. Devices are also known in which the changeover is facilitated by the mounting of slide rollers in the slide approach path.

A device is also known which does not proceed from a magazine having a push rod but from a gripping arrangement which solves the problem of assisting the insertion of a slide by providing that the entire film aperture is designed to be raised and lowered. In this way, when the slides are being removed from the magazine, the bearing area of the slide path comes below the slide support in the magazine and when the slides are moved back into the magazine it comes above the slide support in the magazine so that the slide is lifted over the dividing edge each time.

There is also a change-over device for magazines where the slides are closely stacked adjacent to each other and where the side walls of the slide container are dimensioned so that the slides project above them and on insertion into the projector are placed onto a ledge on the magazine guide shaft. However, this ledge is also separated from the actual film aperture so that difficulties arise in this case during the feeding of the slides.

SUMMARY OF THE INVENTION

Having in mind the limitations of the prior art, it is an object of the present invention to provide a device which does not require any additional structural components and which operates without any movable slide and guide elements.

This object is accomplished in a projector wherein the effective ejection side of the magazine is displaced opposite to the side of the image stage side of the contained slide and the magazine is provided as considered in cross-section, at least in the region of the film aperture, with a step, the profile of which is adapted to conform to that of the bearing side of the magazine containing a slide.

In addition, the surface which is situated at a higher level and thus suitable for use as a supporting path for the slides before beginning a changing operation, possibly even on insertion of the magazine, is constructed so that it continues as a film aperture at the same level and without an intermediate chamber.

This ensures that the slide to be moved slides on its path without any resistance and without any auxiliary means such as slopes, rollers, or the like, at least in the direction of insertion into the projection position. The surface of the step which may be used as a supporting path may extend over the entire length of the magazine guide shaft. In this way, all the slides which project into the guide path when the magazine is inserted will simultaneously be moved onto the guide path of the step. The remaining slides will do the same as the magazine is moved forward. The slides slide along the path over the entire length of the magazine guide shaft.

However, it is also possible to dimension the surface of the step used as a supporting path so that it only extends over an area of a few slide compartments on both sides of the film aperture. This does not produce any feed difficulties as the slides are at the same level in every position. However, for safety reasons, it is advisable to provide inclined sections at both ends of the face of the step acting as an approach path.

In addition, to ensure that the slides can be moved without difficulty or resistance on being returned from the projection position into the magazine, a further feature of the invention provides that the height of the step is such that it only projects to a slight extent over the wall section of the bearing side of the magazine. In some circumstances, this renders the previously mentioned inclined sections particularly necessary.

It has been found to be particularly advantageous to construct the step, or at least its face which is situated at a higher level, integral with the film aperture.

The partitioned magazine, of which the height of the supporting side is approximately ½ to ⅔ the length of the side of a slide, can also be provided with a longitudinal slot, in which control means operate in a known way to raise the slide above one of the slide walls to allow arbitrary use thereof in a position in which the ejection side is parallel to the film aperture. A further advantage is obtained if the ejection side is combined in a known manner with a swing-out blocking element which prevents the slides from falling out unintentionally.

The novel action of the horizontal changer of the present invention is unknown to the state of the art of partitioned magazines. The present invention can also be employed with a trough-like box magazine as well as with a drum magazine.

BRIEF DESCRIPTION OF THE DRAWINGS:

The present invention may best be described by reference to the appended drawings, wherein:

FIG. 5 is a perspective view of a guide shaft with a raised portion on the bottom surface;

FIG. 6 is a side view in cross-section of a magazine guide shaft with a magazine inserted therein and a change device which operates partially vertically and partially horizontally;

FIG. 7 is a side view in partial cross-section of a magazine guide shaft of the projector of the present invention with a drum magazine seated therein; and FIG. 8 is a plan view in partial cross-section of the projector of FIG. 7.

DESCRIPTION OF THE PREFERRED EMBODIMENTS

Figure 1:
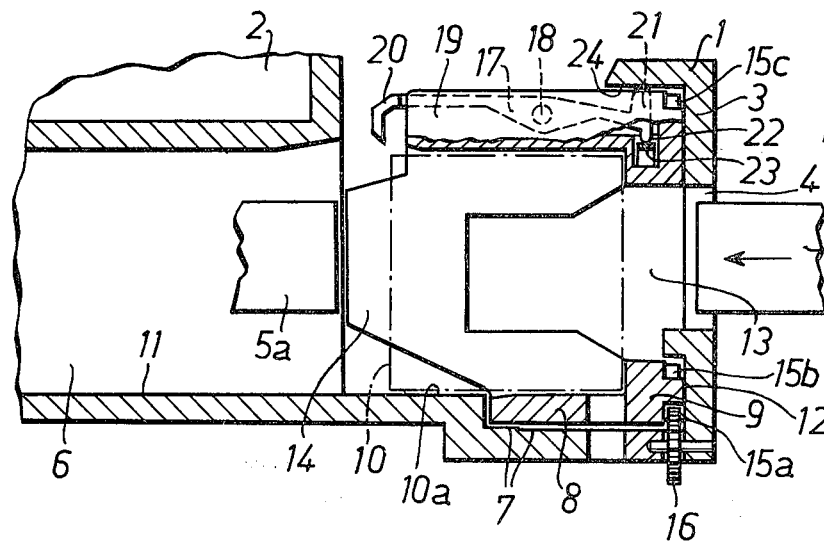
FIG. 1 is a side view in cross-section of a magazine guide shaft of a projector with the magazine inserted therein and showing parts of a horizontally operative changing device.

With particular reference to FIG. 1 is shown a guide shaft of the projector 2 provided on its outer wall 3 with an aperture 4 which admits the passage of the push rod 5 which is displaceable in the plane of the film aperture 6. Its return arm 4a is also displaceable in the same plane.

The bottom face 7 of the magazine guide shaft is constructed in stages. Its profile corresponds to the bearing side 8 of the magazine 9 with the slides 10 inserted therein. Both the part of the step situated at a lower level and the part at a higher level extend over the entire length of the guide shaft. The part 10a which is situated at a higher level is also integral with the bearing surface of the film aperture 6. The bearing side 8 of the magazine 9 extends over an area approximately 2/3 the length of the side of a slide.

The slide therefore projects partially from the magazine. In this way, when the magazine is inserted into the guide shaft all the slides rest directly on the part of the step situated at a higher level. During the feed movement of the magazine, the slides slide on the higher part of the step and as this connects directly with the bearing face of the film aperture the slides are moved in front of the projection window without meeting obstacles.

When the magazine is inserted, its bottom face 12 rests against the outer wall 3 of the shaft 1. This is also provided with an aperture 13 for the passage of the push rod 5. This aperture 13 also extends into the region of the partitioned walls 14. 15a, 15b and 15c designate serrated slats on the bottom face 12. Depending on its position, the feed gear 16 engages in one of the serrated slats.

To prevent the slides from falling out unintentionally, on the side opposite to the bottom face 12, the magazine is provided with a blocking element 17 which may possibly comprise a number of parts. It is adapted to pivot about an axis 18, the bearings of which are formed in two outwardly projecting bars on the front sides of the magazine. For this purpose, the blocking element comprises on its pivot arm an elbow part 20 which embraces the slides. The other pivot arm is in the form of a control ledge 21 which is under the influence of a spring 23 supported in the recess 22. In the blocking position, the control ledge projects over the bars 19 and is pushed back by the stop face 24 of the magazine guide shaft 1 when the magazine is inserted, whereupon the curved part 20 releases the slides for displacement as shown in FIG. 1.

Figure 2:
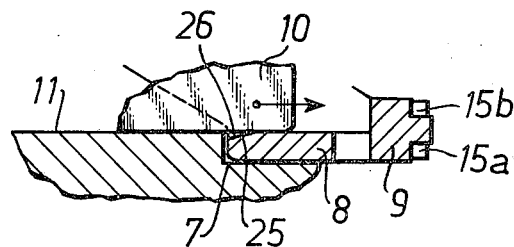
FIGS. 2 and 3 are detailed views of the magazine guide shaft of FIG. 1 in cross-section, having different profiles.

The slides can then slide unimpeded on the bearing surface 11 of the film aperture 6. To prevent any obstacle from arising during the return movement of the slides into the magazine, the edge 25 is provided with a rounded surface 26, as shown in FIG. 2.

Figure 3:
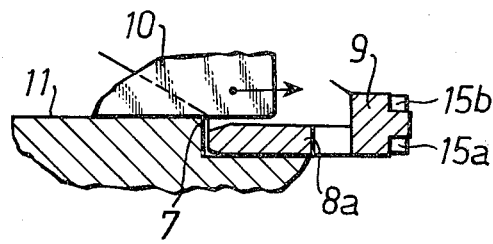
Figure 4:
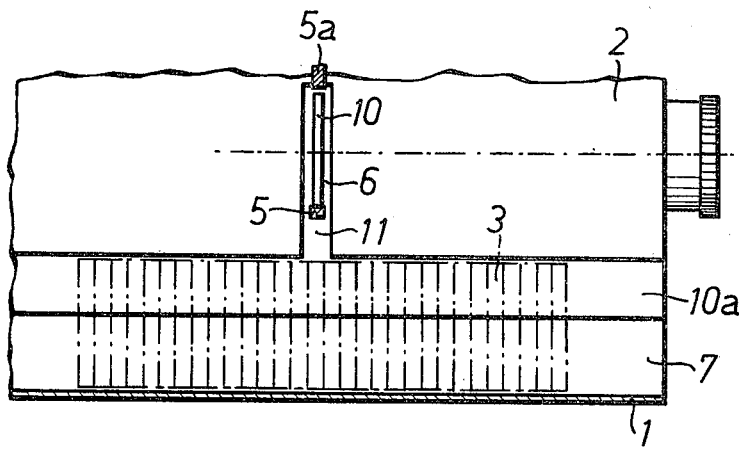
FIG. 4 is a plan view of the guide shaft of FIG. 1 on a smaller scale.

As FIG. 3 illustrates, the thickness of the lateral wall 8a of the magazine is smaller than the gradation of the bottom face 7. This makes for the smooth passage of the slides from the bearing path 11 back into the magazine. This gradation does not produce any disadvantages in the course of displacement in the opposite direction as the slides are disposed on the higher part of the step when they are inserted into the magazine.

In the embodiment according to FIG. 5, the bottom face 7a of the guide shaft 1 has only a graded incline in the narrowest region of the film aperture 26, characterized by the perforated lines. This is in the form of a raised portion 27, the top face 28 of which is generally at the level of the edges 29 of the slides inserted in the magazine. This face 28 continues in the form of the film aperture support. To ensure perfect placement, two approach slopes 30a, 30b are provided at the transition points on both sides. This is not absolutely essential, but increases the reliability of the device. The embodiments according to FIGS. 1–4 may also be provided with the same arrangement of inclined faces.

FIG. 6 shows a guide shaft in which the same magazine as shown in FIGS. 1–5 is inserted not with the open ejection side facing the film apperture, but with this side facing upwards. The feed movement of the slides in this case is effected in the following way: Firstly, the slides are raised by means of the raised portion 31 which has a known construction, and then the slide which has been raised above the height of the lateral wall 8 and brought into the operational range of the gripper 32 is moved by the latter in a transverse direction onto the supporting path 33 of the film aperture. As illustrated, a tongue 24 of this supporting path extends over the front side of the wall 8 as far as the slides. It is apparent from this arrangement that the above-described magazine is also suitable for use in projectors having a gripping mechanism.

The embodiment shown in FIGS. 7 and 8 is concerned with the use of a drum magazine and if necessary also with a longitudinal magazine of the previously disclosed projector 40 with its optic 41 and slide stage 43 supported by the portion of the housing 42, whose plane of the changer 44 is movable. The bearing support 45 of the slide stage 43 projects beyond the lateral wall 46 to form a shoulder portion 47 of the magazine changing track 48. This is done in such a way that step 49 is formed in profile, so that the corner of the slide 50 contained in the drum magazine 51 is supported by the shoulder portion 47. The height of the step 49 corresponds to the thickness of the magazine base 51, on the side of the magazine where the slide is ejected.

Based upon these developments of the magazine guide bearing the slide 50 is easily and without difficulty transferred into the slide track 43 and then returned into the magazine 51.

I claim:

1. In combination a slide projector with a film aperture in a side thereof and a partitioned magazine adapted to accept a slide (10) of a given length, said magazine comprising an ejector side positioned at right angles to said film aperture, a top wall (19) with means (17) for retaining a slide in said magazine and a foreshortened bottom wall (8) having a length less than the given length of a slide and defining a foreshortened operative bearing on which a first portion of the length of the slide bears, said projector having a guide track with a bottom face (7) and a face (10a), and said film aperture having a horizontal continuous bearing surface integral with said guide track and configured to said foreshortened bottom wall, said continuous bearing surface and said face (10a) positioned at a higher level than said bottom face for supporting a second portion of the length of the slide in said magazine and for continuously receiving and transporting the slide through said film aperture.

2. The combination of claim 1, wherein said continuous bearing surface is even with said foreshortened operative bearing.

3. The combination of claim 1, wherein said face (10a) extends longitudinally over the entire length of said guide track.

4. The combination of claim 1, wherein said face (28) extends over an area in excess of the thickness of the slide on both sides of said film aperture.

5. The combination of claim 4, wherein said face (28) has inclined surfaces (30a, 30b) at both ends.

6. The combination of claim 1, wherein said continuous bearing surface and said face is higher than said foreshortened operative bearing.

7. The combination of claim 1, wherein said foreshortened operative bearing has a length of about 1/2 to 2/3 of the given length of a slide.

8. The combination of claim 1, wherein said means for retaining is a swing-out blocking element.

9. The combination of claim 1, wherein said magazine is a drum magazine.

10. The combination of claim 1, wherein said magazine is a longitudinal magazine.

* * * * *